United States Patent
Shibutani et al.

(10) Patent No.: US 9,725,593 B2
(45) Date of Patent: Aug. 8, 2017

(54) POLYLACTIC ACID RESIN COMPOSITION

(71) Applicant: KAO CORPORATION, Tokyo (JP)

(72) Inventors: Ryo Shibutani, Wakayama (JP);
Hiroaki Kishimoto, Sakai (JP)

(73) Assignee: KAO CORPORATION, Tokyo (JP)

( * ) Notice: Subject to any disclaimer, the term of this patent is extended or adjusted under 35 U.S.C. 154(b) by 184 days.

(21) Appl. No.: 14/401,902

(22) PCT Filed: May 28, 2013

(86) PCT No.: PCT/JP2013/064753
§ 371 (c)(1),
(2) Date: Nov. 18, 2014

(87) PCT Pub. No.: WO2013/180120
PCT Pub. Date: Dec. 5, 2013

(65) Prior Publication Data
US 2015/0091211 A1  Apr. 2, 2015

(30) Foreign Application Priority Data
May 30, 2012  (JP) ................................ 2012-122687

(51) Int. Cl.
| C08L 67/04 | (2006.01) |
| C08K 5/3492 | (2006.01) |
| C08K 5/523 | (2006.01) |
| C08K 5/29 | (2006.01) |
| B29C 45/00 | (2006.01) |
| C08K 5/00 | (2006.01) |
| C08L 101/16 | (2006.01) |
| B29K 67/00 | (2006.01) |

(52) U.S. Cl.
CPC .......... *C08L 67/04* (2013.01); *B29C 45/0001* (2013.01); *C08K 5/00* (2013.01); *C08K 5/29* (2013.01); *C08K 5/34922* (2013.01); *C08K 5/523* (2013.01); *B29K 2067/046* (2013.01); *C08L 101/16* (2013.01); *C08L 2201/02* (2013.01); *C08L 2205/24* (2013.01)

(58) Field of Classification Search
CPC ....................................................... C08L 67/04
See application file for complete search history.

(56) References Cited

U.S. PATENT DOCUMENTS

| 6,344,508 B1 | 2/2002 | Endo et al. |
| 2011/0054089 A1 | 3/2011 | Kishimoto et al. |
| 2012/0329920 A1 | 12/2012 | Sato et al. |

FOREIGN PATENT DOCUMENTS

| CN | 1495232 A | 5/2004 |
| JP | 8-73713 A | 3/1996 |
| JP | 11-209587 A | 8/1999 |
| JP | 2000-212412 A | 8/2000 |
| JP | 2002-47398 A | 2/2002 |
| JP | 2002-294051 A | 10/2002 |
| JP | 2009-286999 A | 10/2002 |
| JP | 2004-91584 A | 3/2004 |
| JP | 2004-190025 A | 7/2004 |
| JP | 2006-57037 A | 3/2006 |
| JP | 2008-101084 A | 5/2008 |
| JP | 2008-266432 A | 11/2008 |
| JP | 2008-303320 A | 12/2008 |
| JP | 2008-303351 A | 12/2008 |
| JP | 2010-6869 A | 1/2010 |
| JP | 2010254899 A * | 11/2010 |
| JP | 2011-162651 A | 8/2011 |
| WO | WO 2011/155119 A1 | 12/2011 |
| WO | WO 2012/043219 A1 | 4/2012 |

OTHER PUBLICATIONS

Machine Translation of JP2010-254899A. Nov. 11, 2010.*
Chinese Office Action and Search Report, issued Aug. 3, 2015, for Chinese Application No. 201380027494.6.
International Search Report (Form PCT/ISA/210) for International Application No. PCT/JP2013/064753, dated Jul. 9, 2013.
European Patent Office communication and extended search report issued in the corresponding European Patent Application No. 13797902.7 on Dec. 17, 2015.
Japanese Office Action for Japanese Application No. 2013-112018, dated Jan. 19, 2017.

* cited by examiner

*Primary Examiner* — Robert C Boyle
*Assistant Examiner* — Stephen Rieth
(74) *Attorney, Agent, or Firm* — Birch, Stewart, Kolasch & Birch, LLP

(57) ABSTRACT

A method for producing an injection-molded article of a polylactic acid resin composition, including filling a melt-kneaded product of a polylactic acid resin composition containing a polylactic acid resin, a plasticizer containing a polyoxyalkylene group or an oxyalkylene group, and a mold releasing agent having a melting point of from 20° to 75° C. in an injection-molding machine to mold in a die, wherein the method is characterized in that the above-mentioned injection-molding machine comprises a cylinder at least a part of which has a set temperature of 200° C. or higher, that the die has a surface temperature of 85° C. or higher, and that the die has a surface roughness of 1.0 μm or less.

19 Claims, No Drawings

POLYLACTIC ACID RESIN COMPOSITION

FIELD OF THE INVENTION

The present invention relates to a polylactic acid resin composition. More specifically, the present invention relates to a polylactic acid resin composition which can be suitably used as home electric appliances parts such as containers of intelligent household electric appliances, and a molded article obtained by subjecting the composition to injection-molding.

BACKGROUND OF THE INVENTION

Polylactic acid resins have some features that polylactic acid resins are inexpensive because the polylactic acid resins are produced from L-lactic acid used as a raw material according to a fermentation method from sugars extracted from maize, potato or the like, that the raw materials are derived from plants from which the amount of total carbon dioxide discharged is very small, and that the resins have the properties of being strongly rigid and highly transparent, so that the utilization of the polylactic acid resins is expected at present.

Patent Publication 1 discloses a resin composition containing a polylactic acid resin, and at least two flame retardants selected from bromine-based flame retardants, chlorine-based flame retardants, phosphorus-based flame retardants, nitrogen compound-based flame retardants, silicone-based flame retardants, and other inorganic flame retardants, in order to obtain a resin composition having excellent moldability, mechanical properties, heat resistance, and flame retardant property.

In addition, Patent Publication 2 discloses a polylactic acid resin composition characterized in that a polylactic acid resin is contained as a main component, and the composition is obtained by subjecting a mixture containing a triphenyl phosphate in an amount of from 3 to 30% by mass, a (meth)acrylic ester compound in an amount of from 0.01 to 5% by mass, and a peroxide in an amount of 0.001% by mass or more to melt-kneading, in order to provide a flame retardant, impact-resistant polylactic acid resin composition having excellent heat resistance.

Patent Publication 3 discloses a polylactic acid resin composition containing a polylactic acid resin, a metal hydroxide, a phosphorus-containing compound, and a volatile compound other than the above phosphorus-containing compound, wherein the content of the above phosphorus-containing compound is 10 parts by mass or less, based on 100 parts by mass of a total value of the above polylactic acid resin, in order to provide a polylactic acid resin composition having an excellent balance between flame retardant property and bleeding resistance.

PRIOR ART REFERENCES

Patent Publications

Patent Publication 1: Japanese Patent Laid-Open No. 2004-190025

Patent Publication 2: Japanese Patent Laid-Open No. 2008-101084

Patent Publication 3: WO 2011/155119

SUMMARY OF THE INVENTION

The present invention relates to the following [1] to [7]:
[1] a polylactic acid resin composition obtained by blending a polylactic acid resin with a triaryl phosphate in an amount of exceeding 10 parts by mass and 50 parts by mass or less, a melamine compound in an amount of from 10 to 100 parts by mass, and a carbodiimide compound, based on 100 parts by mass of the polylactic acid resin, and melt-kneading the mixture, wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3;
[2] a polylactic acid resin composition obtained by blending a crosslinked polylactic acid resin with a triaryl phosphate in an amount of exceeding 10 parts by mass and 50 parts by mass or less, and a melamine compound in an amount of from 10 to 100 parts by mass, based on 100 parts by mass of the crosslinked polylactic acid resin, and melt-kneading the mixture, wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3;
[3] a molded article obtained by subjecting a polylactic acid resin composition as defined in the above [1] or [2] to injection-molding;
[4] a method for producing a molded article, including supplying a polylactic acid resin composition as defined in the above [1] or [2] to a cylinder held at 180° to 220° C., and subjecting the polylactic acid resin composition within a mold held at 30° to 110° C. to injection-molding;
[5] a method for producing a polylactic acid resin composition including melt-kneading raw materials including a polylactic acid resin, a triaryl phosphate, a melamine compound, and a carbodiimide compound, wherein the triaryl phosphate is in an amount of exceeding 10 parts by mass and 50 parts by mass or less, and a melamine compound in an amount of from 10 to 100 parts by mass, based on 100 parts by mass of the polylactic acid resin, and wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3;
[6] a method for producing a polylactic acid resin composition including melt-kneading raw materials including a crosslinked polylactic acid resin, a triaryl phosphate, and a melamine compound, wherein the triaryl phosphate is in an amount of exceeding 10 parts by mass and 50 parts by mass or less, and a melamine compound in an amount of from 10 to 100 parts by mass, based on 100 parts by mass of the crosslinked polylactic acid resin, and wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3; and
[7] a method for inhibiting bleed-out of a triaryl phosphate from a molded article, using the molded article obtained by subjecting a polylactic acid resin composition as defined in the above [1] or [2] to injection-molding.

DETAILED DESCRIPTION OF THE INVENTION

Although Patent Publication 1 describes that plural kinds of flame retardants are used, there is a disadvantage that sufficient mechanical properties are not obtained. Also, in the polylactic acid resin composition of Patent Publication 2, there is a disadvantage that the flame retardant bleeds out from the molded article obtained. Although Patent Publication 3 describes that bleeding out of the phosphorus-containing compound can be inhibited, there are some disadvantages that the blending amount of the phosphorus-containing compound is limited, so that impact resistance and durability are not sufficient.

The present invention relates to a polylactic acid resin composition which inhibits bleed-out and has durability while satisfying flame-retardant property and impact resistance, and a molded article obtained with the composition.

The polylactic acid resin composition of the present invention can provide a molded article having excellent bleed-out property while satisfying flame-retardant property and impact resistance, and also having excellent durability.

The polylactic acid resin composition of the present invention is one prepared by blending a polylactic acid resin with a triaryl phosphate having one or more alkylaryl groups having an alkyl group of 1 or 2 carbon atoms, a melamine compound, and a carbodiimide compound, and melt-kneading the mixture, or one prepared by blending a crosslinked polylactic acid resin with a triaryl phosphate having one or more alkylaryl groups having an alkyl group of 1 or 2 carbon atoms, and a melamine compound, and melt-kneading the mixture. The term "blending" as used herein means "blending or containing."

It has been found in the present invention that the generation of bleed-out is inhibited, and further flame-retardant property, impact resistance, and durability are improved by blending a triaryl phosphate having one or more alkylaryl groups having an alkyl group of 1 or 2 carbon atoms and a melamine compound in a specified ratio, and further blending the mixture with a carbodiimide compound. Although the reasons therefor are not elucidated, it is considered as follows: The composition has excellent flame-retardant property, impact resistance, and durability because a specified triaryl phosphate serves to increase an affinity of a melamine compound to a polylactic acid resin or a crosslinked polylactic acid resin, so that the dispersibility of the triaryl phosphate and the melamine compound in the polylactic acid resin is increased. Further, in a case where a carbodiimide compound is used, the effects are enhanced by the copresence thereof, which is considered to be maintained over a long period of time.

Each of the components will be described hereinbelow.

[Polylactic Acid Resin]

The polylactic acid resin includes commercially available polylactic acid resins, for example, LACEA H-100, H-280, H-400, H-440, etc. manufactured by Mitsui Chemicals, Inc., Nature Works PLA/NW3001D and NW4032D manufactured by Nature Works LLC; and polylactic acid resins synthesized from lactic acid and lactides in accordance with a known method. A polylactic acid resin has an optical purity of preferably 90% or more, and more preferably 95% or more, from the viewpoint of improving strength and heat resistance, and, for example, a polylactic acid resin such as NW4032D, manufactured by Nature Works LLC having a relative large molecular weight and a high optical purity is preferred. The optical purity refers to a proportion in % by mol of the L-form or D-form occupying in the polylactic acid resin.

Also, in the present invention, other biodegradable resins, besides the above-mentioned polylactic acid resin, may be blended in a proper amount within the range that would not hamper the effects of the present invention. Other biodegradable resins include polyester resins such as polybutylene succinate, polyhydroxyalkanoic acids, and the like. In addition, a part or all of the above-mentioned polylactic acid resin may be blended as a polymer alloy formed by a blend of the polylactic acid with the other biodegradable resins mentioned above, or with a non-biodegradable resin such as polypropylene. Here, the term "biodegradable or biodegradability" as used herein refers to a property which is capable of being degraded to low molecular compounds by microorganisms in nature. Specifically, the term means biodegradability based on "test on aerobic and ultimate biodegradation degree and disintegration degree under controlled aerobic compost conditions" of JIS K6953, ISO 14855.

In addition, in the present invention, it is preferable that the polylactic acid resin contains a crosslinked polylactic acid resin obtained by previously kneading a polylactic acid resin and a polycarbodiimide at a temperature of from 180° to 230° C., which is also referred to as melt-kneading, and cooling a kneaded mixture, from the viewpoint of impact resistance and durability. Specifically, a part or all of the polylactic acid resin is a crosslinked polylactic acid resin obtained by previously kneading a polylactic acid resin and a polycarbodiimide at a temperature of preferably 180° C. or higher, more preferably 190° C. or higher, and even more preferably 195° C. or higher, and preferably 230° C. or lower, and more preferably 220° C. or lower, and preferably from 180° to 230° C. The content of the crosslinked polylactic acid resin in the polylactic acid resin containing the cross linked polylactic acid resin, i.e. the content of the crosslinked polylactic acid resin in a total amount of the crosslinked polylactic acid resin and a non-crosslinked polylactic acid resin, is preferably from 30 to 100% by mass, more preferably from 50 to 100% by mass, and even more preferably from 80 to 100% by mass.

Specific examples of the polycarbodiimide include aromatic polycarbodiimides such as poly(4,4'-diphenylmethanecarbodiimide), poly(p-phenylenedicarbodiimide), poly(m-phenylenecarbodiimide), poly(diisopropylphenylcarbodiimide), and poly(triisopropylphenylcarbodiimide); alicyclic polycarbodiimides such as poly(dicyclohexylmethanecarbodiimide); and aliphatic polycarbodiimides. The aromatic polycarbodiimides and the alicyclic polycarbodiimides are preferred, and at least one member selected from poly(dicyclohexylmethanecarbodiimide) and poly(diisopropylphenylcarbodiimide) is more preferred, from the viewpoint of increasing reactivity with the polylactic acid resin. These polycarbodiimides can be used alone or in a combination of two or more kinds.

When the polylactic acid resin and a polycarbodiimide are kneaded, the amount of the polycarbodiimide used is preferably 0.1 parts by mass or more, more preferably 0.25 parts by mass or more, and even more preferably 0.5 parts by mass or more, and preferably 5 parts by mass or less, more preferably 2 parts by mass or less, and even more preferably 1.5 parts by mass or less, and preferably from 0.1 to 5 parts by mass, more preferably from 0.25 to 2 parts by mass, even more preferably from 0.25 to 1.5 parts by mass, and even more preferably from 0.5 to 1.5 parts by mass, based on 100 parts by mass of the polylactic acid resin, from the viewpoint of impact resistance, durability, and bleeding resistance.

The kneading of the polylactic acid resin and the polycarbodiimide can be carried out with a known melt-kneader. As the melt-kneader, a single-screw or twin-screw continuous kneader, a batch-type kneader with a roller mill, an open roller-type kneader or the like can be used, and a single-screw or twin-screw continuous kneader is preferred. As the kneader described above, for example, Model KTK, a twin-screw extruder, manufactured by Kobe Steel Ltd.; Model TEM, an extruder manufactured by TOSHIBA MACHINE CO., LTD.; a twin-screw extruder, manufactured by KCK; Co-kneader, manufactured by BUSS; Model PCM, a twin-screw extruder, manufactured by Ikegai Corporation, or the like is suitably used.

The kneading temperature, i.e. the melt-kneading temperature, of the polylactic acid resin and the polycarbodiimide is preferably from 180° to 230° C., more preferably from 190° to 220° C., and even more preferably from 195° to 220° C. In a case where a melt-kneader is used, the temperature means a set temperature of a kneader during melt-kneading. In addition, before melt-kneading, the polylactic acid resin and the polycarbodiimide can be mechanically and homogeneously mixed. A method for mechanically and homogeneously mixing a polylactic acid resin and a polycarbodiimide can be carried out under ordinary conditions with an ordinary mixer having agitation blades or the like, and a means thereof is not particularly limited.

The kneading is carried out preferably from 10 seconds to 5 minutes or so, and more preferably from 20 seconds to 3 minutes or so, depending upon the scale of the melt-kneader.

The termination of the kneading can be confirmed by the measurement of a terminal carboxyl group concentration. The terminal carboxyl group concentration of the resulting crosslinked polylactic acid resin is preferably 20 mmol/kg or less, more preferably 15 mmol/kg or less, even more preferably 12 mmol/kg or less, and still even more preferably 10 mmol/kg or less, from the viewpoint of impact resistance and durability. Although there is no particular lower limit to the terminal carboxyl group concentration, the terminal carboxyl group concentration is preferably 3 mmol/kg or more, from the viewpoint of productivity. Taking these viewpoints together, the terminal carboxyl group concentration is preferably from 3 to 20 mmol/kg, more preferably from 3 to 15 mmol/kg, even more preferably from 3 to 12 mmol/kg, and still even more from 3 to 10 mmol/kg. Here, the terminal carboxyl group concentration can be measured in accordance with the following method.

<Method for Measuring Terminal Carboxyl Group Concentration>

Three grams of a sample polylactic acid resin is dissolved in 100 mL of chloroform, and 50 mL of benzyl alcohol and a small amount of a phenolphthalein ethanol solution are added to the solution, and the carboxy group terminal concentration is obtained by titrating against a 0.05 N potassium hydroxide ethanol solution.

The blending amount of the polylactic acid resin in the polylactic acid resin composition is preferably 30% by mass or more, more preferably 40% by mass or more, and even more preferably 50% by mass or more, and preferably 80% by mass or less, more preferably 70% by mass or less, and even more preferably 60% by mass or less, and preferably from 30 to 80% by mass, more preferably from 40 to 70% by mass, and even more preferably from 50 to 60% by mass, from the viewpoint of satisfying both strength and flexibility of the polylactic acid resin composition, and improving impact resistance. In addition, the blending amount of the crosslinked polylactic acid resin in the polylactic acid resin composition, in a case where the polylactic acid resin is composed of 100% by mass of the crosslinked polylactic acid resin, is preferably the same blending amount as mentioned above. In the present specification, when simply referred to as a polylactic acid resin, for example, a case where a polylactic acid resin contains a crosslinked polylactic acid resin, the polylactic acid resin means an entire polylactic acid resin including the crosslinked polylactic acid resin, and in that case, the blending amount of the polylactic acid resin means a total amount of the crosslinked polylactic acid resin and the non-crosslinked polylactic acid resin. The polylactic acid resin may be composed of 100% by mass of a crosslinked polylactic acid resin. In addition, when referred to as a crosslinked polylactic acid resin, it means 100% by mass of the crosslinked polylactic acid resin. Here, the term "blending amount" as used herein means "content or blending amount."

[Triaryl Phosphate]

The triaryl phosphate usable in the present invention may be a triaryl phosphate containing one or more alkylaryl groups having an alkyl group of 1 or 2 carbon atoms (hereinafter also simply referred to as triaryl phosphate), among which a compound represented by the following general formula:

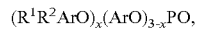

$(R^1R^2ArO)_x(ArO)_{3-x}PO,$ wherein Ar is a benzene ring, each of $R^1$ and $R^2$, which may be identical or different, is a hydrogen atom or an alkyl group of 1 or 2 carbon atoms, excluding a case where both are hydrogen atoms; and x is an integer of from 1 to 3, is preferred.

As to $R^1$ and $R^2$ in the above formula, a case where both are methyl groups, a case where $R^1$ is an ethyl group and $R^2$ is a hydrogen atom, or a case where $R^1$ is a methyl group and $R^2$ is a hydrogen atom is preferred, from the viewpoint of impact resistance, durability, flame-retardant property, and bleeding resistance.

x in the above formula is an integer of from 1 to 3, and x is preferably an integer of from 1 to 2, and more preferably 1, from the viewpoint of impact resistance, durability, flame-retardant property, and bleeding resistance. In other words, the compound represented by the above formula is a compound having one or more, preferably one or two, and more preferably one alkylaryl group having an alkyl group of 1 or 2 atoms.

Specific examples of the triaryl phosphate represented by the above formula include trixylenyl phosphate, tricresyl phosphate, dixylenylphenyl phosphate, dicresylphenyl phosphate, xylenyldiphenyl phosphate, and cresyldiphenyl phosphate. These triaryl phosphates can be used alone or in a combination of two or more kinds. Specifically, the triaryl phosphate may be one or more members selected from the group consisting of trixylenyl phosphate, tricresyl phosphate, dixylenylphenyl phosphate, dicresylphenyl phosphate, xylenyldiphenyl phosphate, and cresyldiphenyl phosphate, and the triaryl phosphate is preferably trixylenyl phosphate and/or cresyldiphenyl phosphate, when flame-retardant property, impact resistance, bleeding resistance, and durability of the polylactic acid resin composition containing the triaryl phosphate are taken into consideration.

From the viewpoint of impact resistance and bleeding resistance, the blending amount of the triaryl phosphate in the polylactic acid resin composition, based on 100 parts by mass of the polylactic acid resin, exceeds 10 parts by mass, preferably 11 parts by mass or more, more preferably 15 parts by mass or more, even more preferably 20 parts by mass or more, and still even more preferably 25 parts by mass or more, from the viewpoint of flame-retardant property, impact resistance and durability, and the blending amount is 50 parts by mass or less, preferably 42 parts by mass or less, and more preferably 38 parts by mass or less, from the viewpoint of bleeding resistance and durability. In addition, the blending amount exceeds 10 parts by mass and 50 parts by mass or less, preferably from 11 to 50 parts by mass or less, more preferably from 15 to 42 parts by mass, even more preferably from 15 to 38 parts by mass, still even more preferably from 20 to 38 parts by mass, and still even more preferably from 25 to 38 parts by mass. In addition, the blending amount of the triaryl phosphate in a case where the polylactic acid resin is composed of 100% by mass of a crosslinked polylactic acid resin can be defined based on 100 parts by mass of the crosslinked polylactic acid resin, which is preferably the same blending amount as above.

[Melamine Compound]

The melamine compound usable in the present invention is a compound having a melamine backbone in the structure, and forms a salt. Examples of the melamine compound include melamine phosphate, dimelamine phosphate, melamine polyphosphate, melamine pyrophosphate, melamine phthalate, melamine phthalimide, melamine borate, ammonium melamine phosphate, ammonium melamine polyphosphate, melamine cyanurate, melamine isocyanurate, and the like. When impact resistance, flame-retardant property, durability, and bleeding resistance of the polylactic acid resin composition containing a melamine compound are taken into consideration, among these melamine compounds, melamine polyphosphate, melamine cyanurate, and melamine isocyanurate are preferred, and melamine cyanurate and/or melamine isocyanurate is more preferred.

The blending amount of the melamine compound in the polylactic acid resin composition, based on 100 parts by mass of the polylactic acid resin, is 10 parts by mass or more, preferably 20 parts by mass or more, and more preferably 33 parts by mass or more, from the viewpoint of flame-retardant property and bleeding resistance, and the blending amount is 100 parts by mass or less, preferably 70 parts by mass or less, more preferably 60 parts by mass or less, and even more preferably 55 parts by mass or less, from the viewpoint of impact resistance and durability. In addition, the blending amount is from 10 to 100 parts by mass, preferably from 20 to 70 parts by mass, more preferably from 20 to 60 parts by mass, even more preferably from 33 to 60 parts by mass, and still even more preferably from 33 to 55 parts by mass. In addition, the blending amount of the melamine compound in a case where the polylactic acid resin is composed of 100% by mass of a crosslinked polylactic acid resin can be defined based on 100 parts by mass of the crosslinked polylactic acid resin, and the same blending amount as mentioned above is preferred.

Accordingly, in one embodiment of the present invention, from the viewpoint of impact resistance, flame-retardant property, durability, and bleeding resistance, based on 100 parts by mass of the polylactic acid resin, it is preferable that the blending amount of the triaryl phosphate is from 11 to 50 parts by mass, and that the blending amount of the melamine compound is from 20 to 70 parts by mass, it is more preferable that the blending amount of the triaryl phosphate is from 15 to 42 parts by mass, and that the blending amount of the melamine compound is from 20 to 70 parts by mass, it is even more preferable that the blending amount of the triaryl phosphate is from 15 to 38 parts by mass, and that the blending amount of the melamine compound is from 20 to 60 parts by mass, it is even more preferable that the blending amount of the triaryl phosphate is from 20 to 38 parts by mass, and that the blending amount of the melamine compound is from 33 to 60 parts by mass, and it is even more preferable that the blending amount of the triaryl phosphate is from 25 to 38 parts by mass, and that the blending amount of the melamine compound is from 33 to 55 parts by mass.

In addition, in a case where the polylactic acid resin is composed of 100% by mass of a crosslinked polylactic acid resin, in one embodiment of the present invention, from the viewpoint of impact resistance, flame-retardant property, durability, and bleeding resistance, based on 100 parts by mass of the crosslinked polylactic acid resin, it is preferable that the blending amount of the triaryl phosphate is from 11 to 50 parts by mass, and that the blending amount of the melamine compound is from 20 to 70 parts by mass, it is more preferable that the blending amount of the triaryl phosphate is from 15 to 42 parts by mass, and that the blending amount of the melamine compound is from 20 to 70 parts by mass, it is even more preferable that the blending amount of the triaryl phosphate is from 15 to 38 parts by mass, and that the blending amount of the melamine compound is from 20 to 60 parts by mass, it is even more preferable that the blending amount of the triaryl phosphate is from 20 to 38 parts by mass, and that the blending amount of the melamine compound is from 33 to 60 parts by mass, and it is even more preferable that the blending amount of the triaryl phosphate is from 25 to 38 parts by mass, and that the blending amount of the melamine compound is from 33 to 55 parts by mass.

In addition, the triaryl phosphate and the melamine compound in the polylactic acid resin composition are in a mass ratio, i.e. triaryl phosphate/melamine compound, of 0.2 or more, preferably 0.3 or more, more preferably 0.4 or more, and even more preferably 0.5 or more, from the viewpoint of flame-retardant property, impact resistance, and durability, and they are in a mass ratio of 3 or less, preferably 2 or less, more preferably 0.9 or less, and even more preferably 0.8 or less, from the viewpoint of flame-retardant property and bleeding resistance. In addition, they are in a mass ratio of from 0.2 to 3, preferably from 0.3 to 2, more preferably from 0.4 to 2, even more preferably from 0.4 to 0.9, and still even more preferably from 0.5 to 0.8.

Further, a total blending amount of the triaryl phosphate and the melamine compound, based on 100 parts by mass of the polylactic acid resin, is preferably 40 parts by mass or more, more preferably 50 parts by mass or more, and even more preferably 70 parts by mass or more, from the viewpoint of flame-retardant property, and the total blending amount is preferably 120 parts by mass or less, more preferably 90 parts by mass or less, and even more preferably 85 parts by mass or less, from the viewpoint of bleeding resistance. When taken these viewpoints together, a total blending amount is preferably from 40 to 120 parts by mass, more preferably from 50 to 90 parts by mass, and even more preferably from 70 to 85 parts by mass. In addition, a total blending amount of the triaryl phosphate and the melamine compound in a case where the polylactic acid resin is composed of 100% by mass of a crosslinked polylactic acid resin can be defined based on 100 parts by mass of the crosslinked polylactic acid resin, and the blending amount as mentioned above is preferred.

[Carbodiimide Compound]

In the present invention, it is preferable to use a carbodiimide compound, from the viewpoint of durability, impact resistance, bleeding resistance, and flame-retardant property. Here, the carbodiimide compound is blended separately from a polylactic acid resin during the melt-kneading of the above-mentioned triaryl phosphate, the above-mentioned melamine compound, and the polylactic acid resin. The carbodiimide compound includes monocarbodiimide compounds and polycarbodiimide compounds which are the same as those used in the preparation of the above-mentioned crosslinked polylactic acid resin.

The monocarbodiimide compound includes aromatic monocarbodiimide compounds such as diphenyl carbodiimide, di-2,6-dimethylphenyl carbodiimide, di-2,6-diethylphenyl carbodiimide, di-2,6-diisopropylphenyl carbodiimide, di-2,6-di-tert-butylphenyl carbodiimide, di-o-tolyl carbodiimide, di-p-tolyl carbodiimide, di-2,4,6-trimethylphenyl carbodiimide, di-2,4,6-triisopropylphenyl carbodiimide, and di-2,4,6-triisobutylphenyl carbodiimide; alicyclic monocarbodiimide compounds such as di-cyclohexyl carbodiimide; aliphatic monocarbodiimide compounds such as di-isopropyl carbodiimide, and di-octadecyl carbodiimide; and the like.

These carbodiimide compounds can be used alone or in a combination of two or more kinds. Among them, the polycarbodiimide compounds are preferred, the aromatic polycarbodiimide compounds and the alicyclic polycarbodiimide compounds are more preferred, and the aromatic polycarbodiimide compounds are even more preferred, from the viewpoint of impact resistance and durability.

The blending amount of the carbodiimide compound, based on 100 parts by mass of the polylactic acid resin, is preferably 0.1 parts by mass or more, more preferably 0.2 parts by mass or more, and even more preferably 0.3 parts by mass or more, from the viewpoint of durability, flame-retardant property, impact resistance, and bleeding resistance, and the blending amount is preferably 10 parts by mass or less, more preferably 5 parts by mass or less, and even more preferably 3 parts by mass or less, from the viewpoint of lowering dispersibility of the carbodiimide, thereby lowering durability, and the blending amount is preferably from 0.1 to 10 parts by mass, more preferably from 0.2 to 5 parts by mass, and even more preferably from 0.3 to 3 parts by mass. Here, the blending amount of the carbodiimide compound refers to a blending amount of the carbodiimide compound to be blended to the polylactic acid resin composition of the present invention, which does not include the polycarbodiimide used in the preparation of the crosslinked polylactic acid resin. In a case where the composition contains plural carbodiimide compounds, the blending amount means a total blending amount. The same applies to the calculation of the following blending mass ratio. Also, the blending amount of the carbodiimide compound in a case where the polylactic acid resin is composed of 100% by mass of a crosslinked polylactic acid resin can be defined based on 100 parts by mass of the crosslinked polylactic acid resin, and the blending amount as defined above is preferred.

The carbodiimide compound and the triaryl phosphate to be blended in the polylactic acid resin composition are in a blending mass ratio, i.e. carbodiimide compound/triaryl phosphate, of preferably 0.01 or more, more preferably 0.02 or more, even more preferably 0.025 or more, and still even more preferably 0.028 or more, from the viewpoint of durability, flame-retardant property, impact resistance, and bleeding resistance, and they are in a mass ratio of preferably 0.1 or less, more preferably 0.05 or less, even more preferably 0.04 or less, and still even more preferably 0.038 or less, from the viewpoint of improving dispersibility of the carbodiimide, thereby improving durability, and they are in a mass ratio of preferably from 0.01 to 0.1, more preferably from 0.02 to 0.05, even more preferably from 0.025 to 0.04, and still even more preferably from 0.028 to 0.038.

[Plasticizer]

The polylactic acid resin composition of the present invention can be further blended and melt-kneaded with a plasticizer. By blending with a plasticizer, plasticity of the polylactic acid resin or the crosslinked polylactic acid resin can be increased to accelerate the crystallization, thereby making impact resistance more excellent.

The plasticizer is not particularly limited, and it is preferable that the plasticizer is, for example, an ester compound and/or an ether compound having a polyoxyalkylene group. Among them, the ester compound having a polyoxyalkylene group is more preferred, from the viewpoint of affinity with the polylactic acid resin or the crosslinked polylactic acid resin.

The ester compound having a polyoxyalkylene group is preferably an ester compound wherein at least one member of the alcohol component constituting the ester compound is an alcohol added with, or having, an alkylene oxide of 2 to 3 carbon atoms per one hydroxyl group in an amount of 0.5 to 5 mol on average, among which an ester compound having two or more ester groups in the molecule wherein at least one member of the alcohol component constituting the ester compound is an alcohol added with, or having, an alkylene oxide of 2 to 3 carbon atoms per one hydroxyl group in an amount of 0.5 to 5 mol on average is more preferred, and a polyhydric alcohol ester or a polycarboxylic acid ether ester having two or more ester groups in the molecule, wherein at least one member of the alcohol component constituting the ester compound is an alcohol added with, or having, an alkylene oxide of 2 to 3 carbon atoms per one hydroxyl group in an amount of 0.5 to 5 mol on average is even more preferred.

Specific compounds are preferably
esters formed between acetic acid and an adduct of glycerol added with ethylene oxide in an amount of from 3 to 6 mol on average, i.e. 1 to 2 mol of ethylene oxide being added per one hydroxyl group;
esters formed between acetic acid and a polyethylene glycol added with ethylene oxide in an amount of from 4 to 6 mol on average;
esters formed between succinic acid and a polyethylene glycol monomethyl ether added with ethylene oxide in an amount of from 2 to 3 mol on average;
esters formed between adipic acid and diethylene glycol monomethyl ether; and
esters formed between 1,3,6-hexanetricarboxylic acid and diethylene glycol monomethyl ether.

The blending amount of the plasticizer is preferably from 0.1 to 30 parts by mass, more preferably from 1 to 30 parts by mass, even more preferably from 3 to 25 parts by mass; even more preferably from 5 to 20 parts by mass, and still even more preferably from 6 to 18 parts by mass, based on 100 parts by mass of the polylactic acid resin. In addition, the blending amount of the plasticizer in a case where the polylactic acid resin is composed of 100% by mass of a crosslinked polylactic acid resin can be defined based on 100 parts by mass of the crosslinked polylactic acid resin, which is preferably the same blending amount as above.

[Organic Crystal Nucleating Agent]

In addition, in the present invention, an organic crystal nucleating agent can be blended and melt-kneaded, from the viewpoint of improving crystallization velocity of the polylactic acid resin or the crosslinked polylactic acid resin, thereby improving impact resistance. The organic crystal nucleating agent which is usable is preferably one or more members selected from the group consisting of the following (a) to (d).

(a) at least one organic compound selected from the group consisting of compounds including an isoindolinone backbone, compounds including a diketo-pyrrolo-pyrrole backbone, compounds including a benzimidazolone backbone, compounds including an indigo backbone, compounds including a phthalocyanine backbone, and compounds including a porphyrin backbone [referred to as organic crystal nucleating agent (a)];

(b) at least one organic compound selected from the group consisting of carbohydrazides, uracils, and N-substituted ureas [referred to as organic crystal nucleating agent (b)];

(c) at least one organic compound selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)]; and (d) at least one organic compound selected from the group consisting of compounds containing hydroxyl group or groups and amide group or groups in the molecule, and hydroxyfatty acid esters [referred to as organic crystal nucleating agent (d)].

Among these, the organic crystal nucleating agent (c) and the organic crystal nucleating agent (d) are preferred, from the viewpoint of shortening a cooling holding time within a mold.

The blending amount of the organic crystal nucleating agent is preferably from 0.1 to 5 parts by mass, more preferably from 0.5 to 3 parts by mass, even more preferably from 0.7 to 3 parts by mass, and still even more preferably from 0.7 to 2 parts by mass, based on 100 parts by mass of the polylactic acid resin. In addition, the blending amount of the organic crystal nucleating agent in a case where the polylactic acid resin is composed of 100% by mass of a crosslinked polylactic acid resin can be defined based on 100 parts by mass of the crosslinked polylactic acid resin, which is preferably the same blending amount as above.

The polylactic acid resin composition in the present invention can be blended and melt-kneaded with, as other components besides those mentioned above, an inorganic crystal nucleating agent, a filler including an inorganic filler and an organic filler, a hydrolysis inhibitor, a flame retardant, an antioxidant, an ultraviolet absorbent, an antistatic agent, an anti-clouding agent, a photostabilizer, a pigment, a mildewproof agent, a bactericidal agent, a blowing agent, or the like, within the range that would not hamper the effects of the present invention. In addition, similarly, polymeric materials and other resin compositions can be added within the range that would not hamper the effects of the present invention.

A melt-kneaded product of the polylactic acid resin composition of the present invention can be prepared without particular limitations, so long as the melt-kneaded mixture is (1) a blend of the above-mentioned polylactic acid resin, a triaryl phosphate, a melamine compound, and a carbodiimide compound; or (2) a blend of the above-mentioned crosslinked polylactic acid resin, a triaryl phosphate, a melamine compound, and optionally a carbodiimide compound. For example, a melt-kneaded product can be prepared by melt-kneading raw materials prepared by blending (1) the above-mentioned polylactic acid resin, a triaryl phosphate, a melamine compound, and a carbodiimide compound, or (2) the above-mentioned crosslinked polylactic acid resin, a triaryl phosphate, a melamine compound, and optionally a carbodiimide compound, and further optionally various additives with a known kneader, such as a closed kneader, a single-screw or twin-screw kneader, or an open roller-type kneader. The raw materials can also be subjected to melt-kneading after homogeneously blending the components raw materials with a Henschel mixer, a super mixer or the like. The triaryl phosphate, the melamine compound and the carbodiimide compound during melt-kneading may be added regardless of the order, and the components may be added in a single-batch, or divided portions. For example, a carbodiimide compound may be first added to a polylactic acid resin and melt-kneaded, and thereafter a triaryl phosphate and a melamine compound are added and melt-kneaded, or alternatively, a part of a carbodiimide compound may be added to a polylactic acid resin and melt-kneaded, and thereafter a triaryl phosphate, a melamine compound, and a remaining carbodiimide compound are added and melt-kneaded. Here, a supercritical gas may be allowed to be present while mixing in a molten state in order to promote the plasticity of the polylactic acid resin during the preparation of a molten product of the polylactic acid resin composition.

The melt-kneading temperature is preferably 170° C. or higher, and more preferably 180° C. or higher, and preferably 240° C. or lower, and more preferably 220° C. or lower, and preferably from 170° to 240° C., more preferably from 170° to 220° C., and even more preferably from 180° to 240° C., from the viewpoint of improving moldability of the polylactic acid resin composition. The melt-kneading time cannot be unconditionally determined because the melt-kneading time differs depending upon melt-kneading temperature and the kinds of the kneaders, and the melt-kneading time is preferably from 30 to 120 seconds.

Here, after melt-kneading the mixture, the melt-kneaded product may be dried in accordance with a known method.

[Method for Producing Polylactic Acid Resin Composition]

In addition, one embodiment of the present invention provides a method for producing a polylactic acid resin composition.

The method for producing a polylactic acid resin composition of the present invention is a method for producing a polylactic acid resin composition including melt-kneading raw materials including a polylactic acid resin, a triaryl phosphate, a melamine compound, and a carbodiimide compound, wherein the triaryl phosphate is in an amount of exceeding 10 parts by mass and 50 parts by mass or less, and a melamine compound in an amount of from 10 to 100 parts by mass, based on 100 parts by mass of the polylactic acid resin, and wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3. Also, in another embodiment, the method for producing a polylactic acid resin composition of the present invention is a method for producing a polylactic acid resin composition including melt-kneading raw materials including a crosslinked polylactic acid resin, a triaryl phosphate, and a melamine compound, wherein the triaryl phosphate is in an amount of exceeding 10 parts by mass and 50 parts by mass or less, and a melamine compound in an amount of from 10 to 100 parts by mass, based on 100 parts by mass of the crosslinked polylactic acid resin, and wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3. The polylactic acid resin, the crosslinked polylactic acid resin, the triaryl phosphate, the melamine compound, and the carbodiimide compound and blending mass ratios thereof are as mentioned above.

[Method for Producing Molded Article]

The polylactic acid resin composition has excellent workability, and can be produced into various molded articles in accordance with known methods. As the molding method, a known method can be used, and, for example, a polylactic acid resin composition of the present invention is subjected to injection-molding, whereby a molded article having excellent impact resistance, bleeding resistance, and flame-retardant property can be provided. Accordingly, the present invention also provides a molded article obtained by subjecting a polylactic acid resin composition of the present invention to injection-molding.

The injection-molded article can be produced, for example, by filling a polylactic acid resin composition of the present invention and molding within a mold having a desired shape using an injection-molded machine.

In the injection molding, a known injection molding machine can be used, including, for example, a machine comprising a cylinder and a screw inserted through an internal thereof as main constituting elements, e.g. J110AD-180H, manufactured by The Japan Steel Works, Ltd. or the like. Here, although the raw materials of the polylactic acid resin composition of the present invention may be fed to a cylinder and directly melt-kneaded, in the present invention, it is preferable that a product previously melt-kneaded is filled in an injection-molded machine, from the viewpoint of increasing homogeneity of the triaryl phosphate, the melamine compound, and the carbodiimide compound, thereby giving excellent bleeding resistance.

The set temperature of the cylinder is preferably 180° C. or higher, from the viewpoint of impact resistance, and the set temperature is preferably 220° C. or lower, and more preferably 210° C. or lower, from the viewpoint of inhibiting the deterioration of the polylactic acid resin. Accordingly, the set temperature is preferably from 180° to 220° C., and more preferably from 180° to 210° C.

The mold temperature is preferably 110° C. or lower, more preferably 90° C. or lower, and even more preferably 80° C. or lower, from the viewpoint of improving crystallization velocity and improving operability. In addition, the mold temperature is preferably 30° C. or higher, more preferably 40° C. or higher, and even more preferably 60° C. or higher. From the above viewpoints, the mold temperature is preferably from 30° to 110° C., more preferably from 40° to 90° C., and even more preferably from 60° to 80° C.

The holding time inside the mold is not particularly limited. For example, in a mold at a temperature of from 80° to 90° C., the holding time is preferably from 3 to 90 seconds, and more preferably from 10 to 80 seconds, from the viewpoint of productivity of a molded article made of the polylactic acid resin composition.

The molded article of the polylactic acid resin composition of the present invention thus obtained has excellent impact resistance, bleeding resistance, flame-retardant property, and durability, and can be suitably used as home electric appliances parts such as containers of intelligent household electric appliances. In addition, the polylactic acid resin composition of the present invention has excellent flame-retardant property without using an inorganic flame-retardant such as a metal hydroxide, and has more excellent impact resistance and durability.

[Method for Inhibiting Bleed-Out of Triaryl Phosphate]

The present invention also provides a method for inhibiting bleed-out of a triaryl phosphate because the molded article has excellent bleeding resistance.

The method for inhibiting bleed-out of a triaryl phosphate of the present invention includes inhibiting bleed-out of a triaryl phosphate having one or more alkylaryl group having an alkyl group of 1 or 2 carbon atoms mentioned above from a molded article, using the molded article obtained by subjecting a polylactic acid resin composition as defined above to injection-molding. Specifically, a polylactic acid resin composition used in an injection-molded article has a feature that the polylactic acid resin composition is obtained by blending a polylactic acid resin with a triaryl phosphate in an amount of exceeding 10 parts by mass and 50 parts by mass or less, a melamine compound in an amount of from 10 to 100 parts by mass, and a carbodiimide compound, based on 100 parts by mass of the polylactic acid resin, and melt-kneading the mixture, or obtained by blending a crosslinked polylactic acid resin with a triaryl phosphate in an amount of exceeding 10 parts by mass and 50 parts by mass or less, and a melamine compound in an amount of from 10 to 100 parts by mass, based on 100 parts by mass of the crosslinked polylactic acid resin, and melt-kneading the mixture. The blending mass ratios of the polylactic acid resin, the crosslinked polylactic acid resin, the triaryl phosphate, the melamine compound, and the carbodiimide compound in the above polylactic acid resin composition are as mentioned above.

With respect to the embodiments described above, the present invention further discloses the following polylactic acid resin composition, the method for production, the molded article, and applications.

<1> A polylactic acid resin composition obtained by blending a polylactic acid resin with a triaryl phosphate in an amount of exceeding 10 parts by mass and 50 parts by mass or less, a melamine compound in an amount of from 10 to 100 parts by mass, and a carbodiimide compound, based on 100 parts by mass of the polylactic acid resin, and melt-kneading the mixture, wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3.

<2> The polylactic acid resin composition according to the above <1>, wherein the blending amount or content of the carbodiimide compound to be blended in the polylactic acid resin, based on 100 parts by mass of the polylactic acid resin, is preferably 0.1 parts by mass or more, more preferably 0.2 parts by mass or more, and even more preferably 0.3 parts by mass or more, and preferably 10 parts by mass or less, more preferably 5 parts by mass or less, and even more preferably 3 parts by mass or less, and preferably from 0.1 to 10 parts by mass, more preferably from 0.2 to 5 parts by mass, and even more preferably from 0.3 to 3 parts by mass.

<3> The polylactic acid resin composition according to the above <1> or <2>, wherein the carbodiimide compound is preferably at least member selected from the group consisting of monocarbodiimide compounds and polycarbodiimide compounds, more preferably polycarbodiimide compounds, and even more preferably aromatic polycarbodiimide compounds and alicyclic polycarbodiimide compounds, and still even more preferably aromatic polycarbodiimide compounds.

<4> The polylactic acid resin composition according to any one of the above <1> to <3>, wherein the carbodiimide compound and the triaryl phosphate to be blended in the polylactic acid resin composition are in a blending mass ratio, i.e. carbodiimide compound/triaryl phosphate, of preferably 0.01 or more, more preferably 0.02 or more, even more preferably 0.025 or more, and still even more preferably 0.028 or more, and preferably 0.1 or less, more preferably 0.05 or less, even more preferably 0.04 or less, and still even more preferably 0.038 or less, and preferably from 0.01 to 0.1, more preferably from 0.02 to 0.05, even more preferably from 0.025 to 0.04, and still even more preferably from 0.028 to 0.038.

<5> The polylactic acid resin composition according to any one of the above <1> to <4>, wherein the blending amount or the content of the triaryl phosphate, based on 100 parts by mass of the polylactic acid resin, exceeds 10 parts by mass, preferably 11 parts by mass or more, more preferably 15 parts by mass or more, even more preferably 20 parts by mass or more, and still even more preferably 25 parts by mass or more, and is 50 parts by mass or less, preferably 42 parts by mass or less, more preferably 38 parts by mass or less, and exceeds 10 parts by mass and is 50 parts by mass or less, preferably from 11 to 50 parts by mass, more preferably from 15 to 42 parts by mass, even more preferably from 15 to 38 parts by mass, still even more preferably from 20 to 38 parts by mass, and still even more preferably from 25 to 38 parts by mass.

<6> The polylactic acid resin composition according to any one of the above <1> to <5>, wherein the blending amount or the content of the melamine compound, based on 100 parts by mass of the polylactic acid resin, is 10 parts by mass or more, preferably 20 parts by mass or more, more preferably 33 parts by mass or more, and is 100 parts by mass or less, preferably 70 parts by mass or less, more preferably 60 parts by mass or less, and even more preferably 55 parts by mass or less, and is from 10 to 100 parts by mass, preferably from 20 to 70 parts by mass, more preferably from 20 to 60 parts by mass, even more preferably from 33 to 60 parts by mass, and still even more preferably from 33 to 55 parts by mass.

<7> The polylactic acid resin composition according to any one of the above <1> to <6>, wherein a total blending amount of the triaryl phosphate and the melamine compound, based on 100 parts by weight of the polylactic acid resin, is preferably 40 parts by mass or more, more preferably 50 parts by mass or more, and even more preferably 70 parts by mass or more, and preferably 120 parts by mass or less, more preferably 90 parts by mass or less, and even more preferably 85 parts by mass or less, and preferably from 40 to 120 parts by mass, more preferably from 50 to 90 parts by mass, and even more preferably from 70 to 85 parts by mass.

<8> The polylactic acid resin composition according to any one of the above <1> to <7>, wherein the blending amount or the content of the polylactic acid resin in the polylactic acid resin composition is preferably 30% by mass or more, more preferably 40% by mass or more, and even more preferably 50% by mass or more, and preferably 80% by mass or less, more preferably 70% by mass or less, and even more preferably 60% by mass or less, and preferably from 30 to 80% by mass, more preferably from 40 to 70% by mass, and even more preferably from 50 to 60% by mass.

<9> The polylactic acid resin composition according to any one of the above <1> to <8>, wherein it is preferable that the blending amount of the triaryl phosphate is from 11 to 50 parts by mass, and that the blending amount of the melamine compound is from 20 to 70 parts by mass, and it is more preferably that the blending amount of the triaryl phosphate is from 15 to 42 parts by mass, and that the blending amount of the melamine compound is from 20 to 70 parts by mass, and it is even more preferably that the blending amount of the triaryl phosphate is from 15 to 38 parts by mass, and that the blending amount of the melamine compound is from 20 to 60 parts by mass, and it is even more preferably that the blending amount of the triaryl phosphate is from 20 to 38 parts by mass, and that the blending amount of the melamine compound is from 33 to 60 parts by mass, and it is even more preferably that the blending amount of the triaryl phosphate is from 25 to 38 parts by mass, and that the blending amount of the melamine compound is from 33 to 55 parts by mass, based on 100 parts by mass of the polylactic acid resin.

<10> The polylactic acid resin composition according to any one of the above <1> to <9>, wherein the polylactic acid resin contains a crosslinked polylactic acid resin obtained by previously melt-kneading a polylactic acid resin and a polycarbodiimide at a temperature of preferably 180° C. or higher, more preferably 190° C. or higher, and even more preferably 195° C. or higher, and preferably 230° C. or lower, and more preferably 220° C. or lower, and preferably from 180° to 230° C., more preferably from 190° to 220° C., and even more preferably from 195° to 220° C., and cooling a kneaded product.

<11> The polylactic acid resin composition according to the above <10>, wherein the amount of the polycarbodiimide used, based on 100 parts by mass of the polylactic acid resin, is preferably 0.1 parts by mass or more, more preferably 0.25 parts by mass or more, and even more preferably 0.5 parts by mass or more, and preferably 5 parts by mass or less, more preferably 2 parts by mass or less, and even more preferably 1.5 parts by mass or less, and preferably from 0.1 to 5 parts by mass, more preferably from 0.25 to 2 parts by mass, and even more preferably from 0.5 to 1.5 parts by mass.

<12> The polylactic acid resin composition according to the above <10> or <11>, wherein the content of the crosslinked polylactic acid resin in a total of the polylactic acid resin and the crosslinked polylactic acid resin, i.e. the content of the crosslinked polylactic acid resin in a total amount of the crosslinked polylactic acid resin and the non-crosslinked polylactic acid resin, is preferably from 30 to 100% by mass, more preferably from 50 to 100% by mass, and even more preferably from 80 to 100% by mass.

<13> A polylactic acid resin composition obtained by blending a crosslinked polylactic acid resin with a triaryl phosphate in an amount of exceeding 10 parts by mass and 50 parts by mass or less, and a melamine compound in an amount of from 10 to 100 parts by mass, based on 100 parts by mass of the crosslinked polylactic acid resin, and melt-kneading the mixture, wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3.

<14> The polylactic acid resin composition according to any one of the above <10> to <13>, wherein the terminal carboxyl group concentration of the crosslinked polylactic acid resin is preferably 20 mmol/kg or less, more preferably 15 mmol/kg or less, even more preferably 12 mmol/kg or less, and still even more preferably 10 mmol/kg or less, and preferably 3 mmol/kg or more, and preferably from 3 to 20 mmol/kg, more preferably from 3 to 15 mmol/kg, even more preferably from 3 to 12 mmol/kg, and still even more preferably from 3 to 10 mmol/kg.

<15> The polylactic acid resin composition according to any one of the above <10> to <14>, wherein the blending amount or the content of the crosslinked polylactic acid resin in the polylactic acid resin composition is preferably 30% by mass or more, more preferably 40% by mass or more, and even more preferably 50% by mass or more, and preferably 80% by mass or less, more preferably 70% by mass or less, and even more preferably 60% by mass or less, and preferably from 30 to 80% by mass, more preferably from 40 to 70% by mass, and even more preferably from 50 to 60% by mass.

<16> The polylactic acid resin composition according to any one of the above <10> to <15>, wherein the blending amount or the content of the triaryl phosphate, based on 100 parts by mass of the crosslinked polylactic acid resin, exceeds 10 parts by mass, preferably 11 parts by mass or more, more preferably 15 parts by mass or more, even more preferably 20 parts by mass or more, and still even more preferably 25 parts by mass or more, and is 50 parts by mass or less, preferably 42 parts by mass or less, and more preferably 38 parts by mass or less, and exceeds 10 parts by mass and is 50 parts by mass or less, preferably from 11 to 50 parts by mass, more preferably from 15 to 42 parts by mass, even more preferably from 15 to 38 parts by mass, still even more preferably from 20 to 38 parts by mass, and still even more preferably from 25 to 38 parts by mass.

<17> The polylactic acid resin composition according to any one of the above <1> to <16>, wherein the triaryl phosphate is a triaryl phosphate containing one or more alkylaryl group having an alkyl group of 1 or 2 carbon atoms, and preferably a compound represented by the general formula:

$(R^1R^2ArO)_x(ArO)_{3-x}PO$, wherein Ar is a benzene ring, each of $R^1$ and $R^2$, which may be identical or different, is a hydrogen atom or an alkyl group of 1 or 2 carbon atoms, excluding a case where both are hydrogen atoms; and x is an integer of from 1 to 3.

<18> The polylactic acid resin composition according to any one of the above <1> to <17>, wherein the triaryl phosphate is preferably at least one member selected from the group consisting of trixylenyl phosphate, tricresyl phosphate, dixylenylphenyl phosphate, dicresylphenyl phosphate, xylenyldiphenyl phosphate, and cresyldiphenyl phosphate, and more preferably trixylenyl phosphate and/or cresyldiphenyl phosphate.

<19> The polylactic acid resin composition according to any one of the above <10> to <18>, wherein the blending amount or the content of the melamine compound, based on 100 parts by mass of the crosslinked polylactic acid resin, and is 10 parts by mass or more, preferably 20 parts by mass or more, and more preferably 33 parts by mass or more, and is 100 parts by mass or less, preferably 70 parts by mass or less, more preferably 60 parts by mass or less, and even more preferably 55 parts by mass or less, and is from 10 to 100 parts by mass, preferably from 20 to 70 parts by mass, more preferably from 20 to 60 parts by mass, even preferably from 33 to 60 parts by mass, and still even more preferably from 33 to 55 parts by mass.

<20> The polylactic acid resin composition according to any one of the above <1> to <19>, wherein the melamine compound is preferably at least one member selected from the group consisting of melamine phosphate, dimelamine phosphate, melamine polyphosphate, melamine pyrophosphate, melamine phthalate, melamine phthalimide, melamine borate, ammonium melamine phosphate, ammonium melamine polyphosphate, melamine cyanurate, and melamine isocyanurate, more preferably at least one member selected from the group consisting of melamine polyphosphate, melamine cyanurate, and melamine isocyanurate, and even more preferably melamine cyanurate and/or melamine isocyanurate.

<21> The polylactic acid resin composition according to any one of the above <10> to <20>, wherein it is preferable that the blending amount of the triaryl phosphate is from 11 to 50 parts by mass, and that the blending amount of the melamine compound is from 20 to 70 parts by mass, and it is more preferable that the blending amount of the triaryl phosphate is from 15 to 42 parts by mass, and that the blending amount of the melamine compound is from 20 to 70 parts by mass, and it is even more preferable that the blending amount of the triaryl phosphate is from 15 to 38 parts by mass, and that the blending amount of the melamine compound is from 20 to 60 parts by mass, and it is even more preferable that the blending amount of the triaryl phosphate is from 20 to 38 parts by mass, and that the blending amount of the melamine compound is 33 to 60 parts by mass, and it is even more preferable that the blending amount of the triaryl phosphate is from 25 to 38 parts by mass, and that the blending amount of the melamine compound is from 33 to 55 parts by mass, based on 100 parts by mass of the crosslinked polylactic acid resin.

<22> The polylactic acid resin composition according to any one of the above <1> to <21>, wherein the triaryl phosphate and the melamine compound in the polylactic acid resin composition are in a mass ratio, i.e. triaryl phosphate/melamine compound, of 0.2 or more, preferably 0.3 or more, more preferably 0.4 or more, and even more preferably 0.5 or more, and of 3 or less, preferably 2 or less, more preferably 0.9 or less, and even more preferably 0.8 or less, and from 0.2 to 3, preferably from 0.3 to 2, more preferably from 0.4 to 2, even more preferably from 0.4 to 0.9, and still even more preferably from 0.5 to 0.8.

<23> The polylactic acid resin composition according to any one of the above <10> to <22>, wherein a total blending amount of the triaryl phosphate and the melamine compound, based on 100 parts by weight of the crosslinked polylactic acid resin, is preferably 40 parts by mass or more, more preferably 50 parts by mass or more, and even more preferably 70 parts by mass or more, and preferably 120 parts by mass or less, more preferably 90 parts by mass or less, and even more preferably 85 parts by mass or less, and preferably from 40 to 120 parts by mass, more preferably from 50 to 90 parts by mass, and even more preferably from 70 to 85 parts by mass.

<24> The polylactic acid resin composition according to any one of the above <1> to <23>, further including an organic crystal nucleating agent blended and melt-kneaded with the mixture.

<25> The polylactic acid resin composition according to the above <24>, wherein the blending amount or the content of the organic crystal nucleating agent, based on 100 parts by mass of the polylactic acid resin, is preferably from 0.1 to 5 parts by mass, more preferably from 0.5 to 3 parts by mass, even more preferably from 0.7 to 3 parts by mass, and still even more preferably from 0.7 to 2 parts by mass.

<26> The polylactic acid resin composition according to the above <24>, wherein the blending amount or the content of the organic crystal nucleating agent, based on 100 parts by mass of the crosslinked polylactic acid resin, is preferably from 0.1 to 5 parts by mass, more preferably from 0.5 to 3 parts by mass, even more preferably from 0.7 to 3 parts by mass, and still even more preferably from 0.7 to 2 parts by mass.

<27> The polylactic acid resin composition according to any one of the above <1> to <26>, further including a plasticizer blended and melt-kneaded with the mixture.

<28> The polylactic acid resin composition according to the above <27>, wherein the blending amount or the content of the plasticizer, based on 100 parts by mass of the polylactic acid resin, is preferably from 0.1 to 30 parts by mass, more preferably from 1 to 30 parts by mass, even more preferably from 3 to 25 parts by mass, still even more preferably from 5 to 20 parts by mass, and still even more preferably from 6 to 18 parts by mass.

<29> The polylactic acid resin composition according to the above <27>, wherein the blending amount or the content of the plasticizer, based on 100 parts by mass of the crosslinked polylactic acid resin, is preferably from 0.1 to 30 parts by mass, more preferably from 1 to 30 parts by mass, even more preferably from 3 to 25 parts by mass, still even more preferably from 5 to 20 parts by mass, and still even more preferably from 6 to 18 parts by mass.

<30> The polylactic acid resin composition according to any one of the above <1> to <29>, wherein the melt-kneading temperature is preferably 170° C. or higher, and more preferably 180° C. or higher, and preferably 240° C. or lower, and more preferably 220° C. or lower, and preferably from 170° to 240° C., more preferably from 170° to 220° C., and even more preferably from 180° to 220° C.

<31> A molded article obtained by subjecting a polylactic acid resin composition as defined in any one of the above <1> to <30> to injection-molding.

<32> A method for producing a molded article as defined in the above <1>, characterized by
supplying a polylactic acid resin composition as defined in any one of the above <1> to <30> to a cylinder held at a temperature of preferably 180° C. or higher, and preferably 220° C. or lower, and more preferably 210° C. or lower, and preferably from 180° to 220° C., and more preferably from 180 to 210° C., and
subjecting the polylactic acid resin composition within a mold held at a temperature of preferably 110° C. or lower, more preferably 90° C. or lower, and even more preferably 80° C. or lower, and preferably 30° C. or higher, more preferably 40° C. or higher, and even more preferably 60° C. or higher, and preferably from 30° to 110° C., more preferably from 40° to 90° C., and even more preferably from 60° to 80° C. to injection-molding.

<33> A method for producing a polylactic acid resin composition as defined in the above <1>, including melt-kneading raw materials including a polylactic acid resin, a triaryl phosphate, a melamine compound, and a carbodiimide compound, wherein the triaryl phosphate is in an amount of exceeding 10 parts by mass and 50 parts by mass or less, and a melamine compound in an amount of from 10 to 100 parts by mass, based on 100 parts by mass of the polylactic acid resin, and wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3.

<34> A method for producing a polylactic acid resin composition as defined in the above <9>, including melt-kneading raw materials including a crosslinked polylactic acid resin, a triaryl phosphate, and a melamine compound, wherein the triaryl phosphate is in an amount of exceeding 10 parts by mass and 50 parts by mass or less, and a melamine compound in an amount of from 10 to 100 parts by mass, based on 100 parts by mass of the crosslinked polylactic acid resin, and wherein the triaryl phosphate contains one or more alkylaryl groups having an alkyl group of 1 or 2 carbon atoms, and wherein the triaryl phosphate and the melamine compound are in a mass ratio, i.e. triaryl phosphate/melamine compound, of from 0.2 to 3.

<35> The method for producing a polylactic acid resin composition according to the above <33> or <34>, wherein the melt-kneading temperature is preferably 170° C. or higher, more preferably 180° C. or higher, and preferably 240° C. or lower, and more preferably 220° C. or lower, and preferably from 170° to 240° C., more preferably from 170° to 220° C., and even more preferably from 180° to 220° C.

<36> A method for inhibiting bleed-out of a triaryl phosphate from a molded article, using the molded article obtained by subjecting a polylactic acid resin composition as defined in the any one of above <1> to <30> to injection-molding.

EXAMPLES

The present invention will be explained more specifically hereinbelow by showing Examples and Comparative Examples, without intending to limit the present invention to the Examples set forth below. Here, parts in Examples are parts by weight, unless specified otherwise.

Production Example 1 of Polylactic Acid Resin Treated with Polycarbodiimide

Fifty parts of a polylactic acid resin (a-1) manufactured by Nature Works, 4032D, terminal carboxyl group concentration: 22 mmol/kg, as a polylactic acid resin, and 0.5 parts of a poly(dicyclohexylmethane carbodiimide), manufactured by Nisshinbo Chemical Inc., Carbodilite LA-1, as a polycarbodiimide-based crosslinking agent were melt-kneaded with a twin-screw extruder manufactured by Ikegai Corporation, PCM-45 at a set temperature of a cylinder of 200° C., a rotational speed of 100 rpm, and a feeding rate of 30 kg/h, and the melt-kneaded product was strand-cut, to provide pellets of a crosslinked polylactic acid in which the polylactic acid resin was crosslinked with the polycarbodiimide-based crosslinking agent (crosslinked polylactic acid resin), the pellets having a diameter of from 3 to 4 mm. The terminal carboxyl group concentration of the resulting crosslinked polylactic acid resin was 7 mmol/kg.

Examples 1 to 22 and Comparative Examples 1 to 9

[Step A]

Raw materials for compositions as listed in Tables 1 to 4 were melt-kneaded at 190° C. with an intermeshing co-rotating twin-screw extruder, manufactured by TOSHIBA MACHINE CO., LTD., TEM-41 SS, and strand-cut, to provide pellets of the polylactic acid resin compositions. Here, the resulting pellets were subjected to dehumidification drying at 110° C. for 2 hours, to adjust its water content to 500 ppm or less. Here, in Examples 17 to 22, a polylactic acid resin treated with the above-mentioned polycarbodiimide was used.

[Step B]

The pellets obtained in the step A were injection-molded with an injection molding machine J75E-D manufactured by The Japan Steel Works, Ltd., of which cylinder temperature was set at 200° C. under conditions of a mold temperature of 80° C., and a molding time of 60 seconds, to provide some test pieces, which were rectangular test pieces having dimensions of 125 mm×12 mm×6 mm, 125 mm×12 mm×1.6 mm, and 63 mm×13 mm×6 mm.

Here, the raw materials in Tables 1 to 4 are as follows.
[Polylactic Acid Resin]
4032D: Polylactic acid resin, Nature Works 4032D, manufactured by Nature Works LLC
[Organic Crystal Nucleating Agent]
SLIPACKS H: Ethylenebis 12-hydroxystearamide, manufactured by Nippon Kasei Chemical Co., Ltd.
PPA-Zn: A zinc salt of unsubstituted phenylphosphonic acid, manufactured by NISSAN CHEMICAL INDUSTRIES, LTD.
[Triaryl Phosphate Containing One or More Alkylaryl Groups Having Alkyl Group of 1 or 2 Carbon Atoms—Triaryl Phosphate]
CDP: Cresyldiphenyl phosphate, manufactured by DAIHACHI CHEMICAL INDUSTRY CO., LTD.
TXP: Trixylenyl phosphate, manufactured by DAIHACHI CHEMICAL INDUSTRY CO., LTD.
[Other Phosphorus-Containing Compound]
TPP: Triphenyl phosphate, manufactured by DAIHACHI CHEMICAL INDUSTRY CO., LTD.
REOFOS 65: Isopropylated product of triaryl phosphate, manufactured by Ajinomoto Fine-Techno Co., Inc.
SPB-100: Hexaphenoxycyclophosphazene, manufactured by Otsuka Chemical Co., Ltd.
HCA: 9,10-Dihydro-9-oxa-10-phosphaphenanthren-10-oxide, manufactured by Sanko, a diaryl compound
Fyrolflex RDP: 1,3-Phenylenebis(diphenylphosphate), manufactured by ICL-IP JAPAN
[Melamine Compound]
Melamine Cyanurate: MC-6000, manufactured by NISSAN CHEMICAL INDUSTRIES, LTD.
Melamine Polyphosphate: APINON MPP-A, manufactured by Sanwa Chemical Co., Ltd.
[Nitrogen-Containing Compound]
Guanidine sulfamate: APINON-101, manufactured by Sanwa Chemical
[Carbodiimide Compound]
Polycarbodiimide: Stabaxol P, manufactured by Rhein Chemie Rheinau GmbH, an aromatic polycarbodiimide compound
Monocarbodiimide: Stabaxol I LF, manufactured by Rhein Chemie Rheinau GmbH
LA-1: Carbodilite LA-1, manufactured by Nisshinbo Chemical, alicyclic polycarbodiimide compound The properties of the resulting molded articles were evaluated in accordance with the methods of the following Test Examples 1 to 4. The results are shown in Tables 1 to 4.

Test Example 1

Evaluation of Flame-Retardant Property

Using test pieces which were rectangular test pieces having dimensions of 125 mm×12 mm×1.6 mm, a burning test was carried out for five of the samples in accordance with the procedures for safety standard UL94 vertical burning test of Underwriters Laboratories, including bringing a lower end of a sample held vertically into contact with flame of a gas burner for 10 seconds, and thereafter further bringing the sample in contact with flame for additional 10 seconds if the burning stopped within 30 seconds. On the bases of rating standards of UL94 vertical burning test (UL94V), the ratings of V-2, V-1, and V-0 were made. The rating criteria were shown hereinbelow. Here, those that do not fall under these rating criteria were indicated for flame-retardant property as "Not."
—V-0
After being brought into each contact to flame, not one sample continues to burn for 10 seconds or more.
A total burning time over 10 times of being brought into contact to flame in 5 samples does not exceed 50 seconds.
No samples burn as far as a position of a clamp for fixing.
No samples would drop flaming particles that would ignite cotton swabs placed at the lower part of the samples.
After bringing into contact with flame for a second time, no sample persists red heat for 30 seconds or more.
—V-1
After being brought into each contact to flame, not one sample continues to burn for 30 seconds or more.
A total burning time over 10 times of being brought into contact to flame in 5 samples does not exceed 250 seconds.
No samples burn as far as a position of a clamp for fixing.
No samples would drop flaming particles that would ignite cotton swabs placed at the lower part of the samples.
After bringing into contact with flame for a second time, no sample persists red heat for 60 seconds or more.
—V-2
After being brought into each contact to flame, not one sample continues to burn for 30 seconds or more.
A total burning time over 10 times of being brought into contact to flame in 5 samples does not exceed 250 seconds.
No samples burn as far as a position of a clamp for fixing.
flaming particles are allowed to drop that would ignite cotton swabs placed at the lower part of the samples.
After bringing into contact with flame for a second time, no sample persists red heat for 60 seconds or more.

Test Example 2

Evaluation of Impact Resistance

Test pieces having dimensions of 63 mm×13 mm×6 mm were subjected to an impact test at n=10 with an Izod impact tester manufactured by YASUDA SEIKI SEISAKUSHO LTD. as prescribed in ASTM D256, to measure an Izod impact strength, J/m, and a number-average thereof was shown. The higher the Izod impact strength, J/m, the more excellent the impact resistance. The Izod impact strength, J/m, is preferably 60 J/m or more, and more preferably 65 J/m or more.

Test Example 3

Evaluation of Durability

Test pieces having dimensions of 125 mm×12 mm×6 mm were kept in a thermostat chamber under conditions of a temperature of 60° C. and humidity of 85% for 400 hours, and thereafter allowed to stand overnight at room temperature. Thereafter, the test pieces were subjected to Evaluation of Impact Resistance of Test Example 2. As to the results obtained, a holding ratio, %, from an initial physical property value before carrying out the durability test was calculated. The calculation method is shown hereinbelow.

$$\% \text{Holding Ratio} = \frac{\text{Impact Test Results After Carrying out Durability Test}}{\text{Impact Test Results Before Carrying out Durability Test}} \times 100$$

The durability, in terms of a holding ratio, %, is preferably 55% or more, more preferably 60% or more, still more preferably 70% or more, and still even more 80% or more.

Test Example 4

Evaluation of Bleeding Resistance

Test pieces having dimensions of 125 mm×12 mm×1.6 mm were allowed to stand in a thermostat chamber under conditions of a temperature of 60° C. and humidity of 85% for one week, and the presence or absence of bleed-out of the additives in the external appearance was visually observed. The bleeding resistance was evaluated in accordance with the following rating standards. The smaller the bleed-out, the more excellent the bleeding resistance.

3: Not able to confirm visually, and a liquid not depositing even when touched over with a finger.
2: Not able to confirm visually, but a slight feel of liquid deposits when touched over with a finger.
1: Liquid droplets being visually confirmed on the surface of the molded article, and a liquid deposits when touched over with a finger, leaving a line of liquid on the surface of the molded article.

TABLE 1

| | | Examples | | | | | | | | |
|---|---|---|---|---|---|---|---|---|---|---|
| Components | | 1 | 2 | 3 | 4 | 5 | 6 | 7 | 8 | 9 |
| Polylactic Acid Resin | 4032D | 100 | 100 | 100 | 100 | 100 | 100 | 100 | 100 | 100 |
| Organic Crystal Nucleating Agent | SLIPACKS H | 0.5 | 0.5 | 0.5 | 0.5 | 0.5 | 0.5 | 0.5 | 0.5 | 0.5 |
| | PPA-Zn | 0.5 | 0.5 | 0.5 | 0.5 | 0.5 | 0.5 | 0.5 | 0.5 | 0.5 |
| Triaryl Phosphate | CDP | 30 | 45 | 40 | 15 | 30 | 30 | 30 | 30 | — |
| | TXP | — | — | — | — | — | — | — | — | 30 |
| Melamine Compound | Melamine Cyanurate | 45 | 45 | 45 | 45 | 70 | 65 | 30 | 20 | 45 |
| | Melamine Polyphosphate | — | — | — | — | — | — | — | — | — |
| Carbodiimide Compound | Polycarbodiimide | 1 | 1 | 1 | 1 | 1 | 1 | 1 | 1 | 1 |
| | Monocarbodiimide | — | — | — | — | — | — | — | — | — |
| | LA-1 | — | — | — | — | — | — | — | — | — |
| Triaryl Phosphate/Melamine Compound, Blending Mass Ratio | | 0.67 | 1.00 | 0.89 | 0.33 | 0.43 | 0.46 | 1.00 | 1.50 | 0.67 |
| Carbodiimide Compound/Triaryl Phosphate, Blending Mass Ratio | | 0.033 | 0.022 | 0.025 | 0.067 | 0.033 | 0.033 | 0.033 | 0.033 | 0.033 |
| PLA Resin Content in the Composition, % by Mass | | 56.5 | 52.1 | 53.5 | 61.7 | 49.5 | 50.8 | 61.7 | 65.8 | 56.5 |
| Properties | Flame-Retardant Property | V-0 | V-0 | V-0 | V-1 | V-0 | V-0 | V-1 | V-1 | V-0 |
| | Impact Resistance, Izod, J/m | 70 | 75 | 73 | 63 | 61 | 63 | 75 | 80 | 68 |
| | Durability, Holding Ratio, % | 91 | 83 | 86 | 89 | 73 | 82 | 90 | 88 | 89 |
| | Bleeding Resistance | 3 | 2 | 2 | 3 | 2 | 2 | 3 | 3 | 3 |

* The amount of the raw materials used is parts by mass.

TABLE 2

| | | Examples | | | | | | | | |
|---|---|---|---|---|---|---|---|---|---|---|
| Components | | 10 | 11 | 12 | 13 | 14 | 15 | 16 | 17 | 18 |
| Polylactic Acid Resin | 4032D | 100 | 100 | 100 | 100 | 100 | 100 | 100 | — | — |
| | 4032D, treated with carbodiimide | — | — | — | — | — | — | — | 100 | 100 |
| Organic Crystal Nucleating Agent | SLIPACKS H | 0.5 | 0.5 | 0.5 | 0.5 | 0.5 | 0.5 | 0.5 | 0.5 | 0.5 |
| | PPA-Zn | 0.5 | 0.5 | 0.5 | 0.5 | 0.5 | 0.5 | 0.5 | 0.5 | 0.5 |
| Triaryl Phosphate | CDP | 30 | 45 | 42 | 25 | 15 | 30 | 30 | 30 | — |
| | TXP | — | — | — | — | — | — | — | — | 30 |
| Melamine Compound | Melamine Cyanurate | — | 20 | 35 | 55 | 70 | 45 | 45 | 45 | 45 |
| | Melamine Polyphosphate | 45 | — | — | — | — | — | — | — | — |
| Carbodiimide Compound | Polycarbodiimide | 1 | 1 | 1 | 1 | 1 | — | — | 1 | 1 |
| | Monocarbodiimide | — | — | — | — | — | 1 | — | — | — |
| | LA-1 | — | — | — | — | — | — | 1 | — | — |

TABLE 2-continued

| | | Examples | | | | | | | | |
|---|---|---|---|---|---|---|---|---|---|---|
| Components | | 10 | 11 | 12 | 13 | 14 | 15 | 16 | 17 | 18 |
| Triaryl Phosplate/Melamine Compound, Blending Mass Ratio | | 0.67 | 2.25 | 1.20 | 0.45 | 0.21 | 0.67 | 0.67 | 0.67 | 0.67 |
| Carbodiimide Compound/Triaryl Phosphate, Blending Mass Ratio | | 0.033 | 0.022 | 0.024 | 0.040 | 0.067 | 0.033 | 0.033 | 0.033 | 0.033 |
| PLA Resin Content in the Composition, % by Mass | | 56.5 | 59.9 | 55.9 | 54.9 | 53.5 | 56.5 | 56.5 | 56.5 | 56.5 |
| Properties | Flame-Retardant Property | V-1 | V-1 | V-0 | V-0 | V-1 | V-0 | V-0 | V-0 | V-0 |
| | Impact Resistance, Izod, J/m | 63 | 86 | 77 | 67 | 60 | 62 | 61 | 75 | 72 |
| | Durability, Holding Ratio, % | 74 | 89 | 87 | 88 | 71 | 78 | 75 | 93 | 88 |
| | Bleeding Resistance | 3 | 2 | 2 | 3 | 3 | 3 | 3 | 3 | 3 |

* The amount of the raw materials used is parts by mass.

TABLE 3

| | | Comparative Examples | | | | | | | | |
|---|---|---|---|---|---|---|---|---|---|---|
| Components | | 1 | 2 | 3 | 4 | 5 | 6 | 7 | 8 | 9 |
| Polylactic Acid Resin | 4032D | 100 | 100 | 100 | 100 | 100 | 100 | 100 | 100 | 100 |
| Organic Crystal Nucleating Agent | SLIPACKS H | 0.5 | 0.5 | 0.5 | 0.5 | 0.5 | 0.5 | 0.5 | 0.5 | 0.5 |
| | PPA-Zn | 0.5 | 0.5 | 0.5 | 0.5 | 0.5 | 0.5 | 0.5 | 0.5 | 0.5 |
| Triaryl Phosphate | CDP | 11 | — | 50 | 30 | — | 30 | — | — | — |
| Other Phosphorus-Containing Compounds | REOFOS 65 | — | — | — | — | — | — | 30 | — | — |
| | TPP | — | — | — | — | — | — | — | 30 | — |
| | SPB-100 | — | — | — | — | — | — | — | — | 30 |
| | HCA | — | 30 | — | — | — | — | — | — | — |
| | Fyrolflex RDP | — | — | — | — | 30 | — | — | — | — |
| Melamine Compound | Melamine Cyanurate | 75 | 45 | 10 | 45 | 45 | — | 45 | 45 | 45 |
| Nitrogen-Containing Compound | Guanidine Sulfamate | — | — | — | — | — | 45 | — | — | — |
| Carbodiimide Compound | Polycarbodiimide | 1 | 1 | 1 | — | 1 | 1 | 1 | 1 | 1 |
| | Monocarbodiimide LA-1 | — | — | — | — | — | — | — | — | — |
| (Triaryl Phosphate or Other Phosphorus-Containing Compound)/(Melamine Compound or Nitrogen-Containing Compound), Blending Mass Ratio | | 0.15 | 0.67 | 5.00 | 0.67 | 0.67 | 0.67 | 0.67 | 0.67 | 0.67 |
| Carbodiimide Compound/(Triaryl Phosphate or Other Phosphorus-Containing Compound), Blending Mass Ratio | | 0.091 | 0.033 | 0.020 | — | 0.033 | 0.033 | 0.033 | 0.033 | 0.033 |
| PLA Resin Content in the Composition, % by Mass | | 53.2 | 56.5 | 61.7 | 56.8 | 56.5 | 56.5 | 56.5 | 56.5 | 56.5 |
| Properties | Flame-Retardant Property | V-1 | Not | Not | V-2 | V-1 | Not | V-1 | Not | V-0 |
| | Impact Resistance, Izod, J/m | 53 | 49 | 90 | 63 | 60 | 56 | 65 | 61 | 70 |
| | Durability, Holding Ratio, % | 68 | 69 | 87 | 44 | 63 | 52 | 62 | 59 | 69 |
| | Bleeding Resistance | 3 | 2 | 1 | 2 | 1 | 1 | 1 | 1 | 1 |

* The amount of the raw materials used is parts by mass.

TABLE 4

| | | Examples | | | |
|---|---|---|---|---|---|
| Components | | 19 | 20 | 21 | 22 |
| Polylactic Acid Resin | 4032D | — | — | — | — |
| | 4032D, treated with carbodiimide | 100 | 100 | 100 | 100 |
| Organic Crystal Nucleating Agent | SLIPACKS H | 0.5 | 0.5 | 0.5 | 0.5 |
| | PPA-Zn | 0.5 | 0.5 | 0.5 | 0.5 |
| Triaryl Phosphate | CDP | 30 | 45 | 30 | 45 |
| | TXP | — | — | — | — |
| Melamine Compound | Melamine Cyanurate | 45 | 45 | 70 | 20 |
| | Melamine Polyphosphate | — | — | — | — |
| Carbodiimide Compound | Polycarbodiimide | — | — | — | — |
| | Mono-carbodiimide LA-1 | — | — | — | — |

TABLE 4-continued

|  | | Examples | | | |
| --- | --- | --- | --- | --- | --- |
| Components | | 19 | 20 | 21 | 22 |
| Triaryl Phosphate/Melamine Compound, Blending Mass Ratio | | 0.67 | 1.00 | 0.43 | 2.25 |
| Carbodiimide Compound/Triaryl Phosphate, Blending Mass Ratio | | — | — | — | — |
| PLA Resin Content in the Composition, % by Mass | | 56.8 | 52.4 | 49.8 | 60.2 |
| Properties | Flame-Retardant Property | V-0 | V-0 | V-0 | V-1 |
| | Impact Resistance, Izod, J/m | 72 | 79 | 67 | 88 |
| | Durability, Holding Ratio, % | 63 | 62 | 58 | 70 |
| | Bleeding Resistance | 3 | 2 | 3 | 2 |

* The amount of the raw materials used is parts by mass.

From the results of Tables 1 to 3, the polylactic acid resin compositions of the present invention prepared by blending a polylactic acid resin, a specified flame retardant, and a specified hydrolysis inhibitor (Examples 1 to 18) showed impact resistance of 60 J/m or more, and as to the durability, a holding ratio of 71% or more was accomplished. Further, the polylactic acid resin composition of the present invention showed excellent bleeding resistance, and made it possible to accomplish flame-retardant property with a rating of V-1 or better. In addition, from the results of Table 4, Examples 19 to 22, which were crosslinked polylactic acid resins, without using a carbodiimide compound had excellent impact resistance and bleeding resistance, even though they had lowered durability as compared to Examples 1 to 18, and made it possible to accomplish flame-retardant property with a rating of V-1 or better.

On the other hand, the polylactic acid resin compositions shown in Comparative Examples 3 and 5 to 9 had deteriorated bleeding resistance, making it impractical for use. In a case of Comparative Example 3 where the mass ratio of the triaryl phosphate to the melamine compound, i.e. triaryl phosphate/melamine compound, was too large, a case of Comparative Example 5 where a condensed phosphoric ester was blended, a case of Comparative Example 6 where a nitrogen-containing compound other than a melamine compound was blended, a case of Comparative Example 7 where an alkylaryl phosphate having an isopropyl group was blended, a case of Comparative Example 8 where a triaryl phosphate without having an alkyl group was blended, and a case of Comparative Example 9 where a phosphazene compound was blended, bleeding resistance was not sufficient in all the cases. In addition, in a case of Comparative Example 1 where an amount of CDP was small and a mass ratio of the triaryl phosphate to the melamine compound, i.e. triaryl phosphate/melamine compound, was too small, and impact resistance is low even while having excellent bleeding resistance, and in a case of Comparative Example 2 where a phosphananthrene compound was blended, flame-retardant property was deteriorated even though bleeding resistance was improved. Also, in a case of Comparative Example 4 where a carbodiimide compound was not used, flame-retardant property, and durability were not sufficient.

It can be seen from the above results that the polylactic acid resin composition of the present invention has an excellent balance in flame-retardant property, impact resistance, bleeding resistance, and durability.

INDUSTRIAL APPLICABILITY

The polylactic acid resin composition of the present invention can be suitably used as home electric appliances parts such as containers of intelligent household electric appliances.

The invention claimed is:

1. A polylactic acid resin composition obtained by blending a polylactic acid resin with a triaryl phosphate in an amount of exceeding 10 parts by mass and 50 parts by mass or less, a melamine compound in an amount of from 10 to 100 parts by mass, and a carbodiimide compound, based on 100 parts by mass of the polylactic acid resin, and melt-kneading the mixture, wherein the triaryl phosphate is one or more members selected from the group consisting of trixylenyl phosphate, tricresyl phosphate, dixylenylphenyl phosphate, dicresylphenyl phosphate, xylenyldiphenyl phosphate, and cresyldiphenyl phosphate, wherein the triaryl phosphate and the melamine compound are in a mass ratio, i.e. triaryl phosphate/melamine compound, of from 0.2 to 3, and wherein the melamine compound is melamine polyphosphate, melamine cyanurate, or melamine isocyanurate.

2. The polylactic acid resin composition according to claim 1, wherein the blending amount of the carbodiimide compound is from 0.1 to 10 parts by mass, based on 100 parts by mass of the polylactic acid resin.

3. The polylactic acid resin composition according to claim 1, wherein the carbodiimide compound comprises an aromatic polycarbodiimide compound.

4. The polylactic acid resin composition according to claim 1, wherein the carbodiimide compound and the triaryl phosphate blended in the polylactic acid resin composition are in a mass ratio, i.e. carbodiimide compound/triaryl phosphate, of from 0.01 to 0.1.

5. The polylactic acid resin composition according to claim 1, wherein a total blending amount of the triaryl phosphate and the melamine compound is from 40 to 120 parts by mass, based on 100 parts by mass of the polylactic acid resin.

6. The polylactic acid resin composition according to claim 1, wherein the blending amount of the triaryl phosphate is from 20 to 38 parts by mass, and wherein the blending amount of the melamine compound is from 33 to 60 parts by mass, based on 100 parts by mass of the polylactic acid resin.

7. The polylactic acid resin composition according to claim 1, wherein the blending amount of the triaryl phosphate is from 15 to 38 parts by mass, and wherein the blending amount of the melamine compound is from 20 to 60 parts by mass, based on 100 parts by mass of the polylactic acid resin.

8. The polylactic acid resin composition according to claim 1, wherein the polylactic acid resin comprises a crosslinked polylactic acid resin obtained by previously kneading a polylactic acid resin and a polycarbodiimide at 180° to 230° C., and cooling a kneaded mixture.

9. The polylactic acid resin composition according to claim 8, wherein a terminal carboxyl group concentration of the crosslinked polylactic acid resin is from 3 to 20 mmol/kg.

10. The polylactic acid resin composition according to claim 1, wherein the melamine compound is melamine cyanurate or melamine isocyanurate.

11. The polylactic acid resin composition according to claim 8, wherein a total blending amount of the triaryl phosphate and the melamine compound is from 40 to 120 parts by mass, based on 100 parts by mass of the crosslinked polylactic acid resin.

12. The polylactic acid resin composition according to claim 1, further comprising an organic crystal nucleating agent.

13. The polylactic acid resin composition according to claim 8, wherein the blending amount of the triaryl phosphate is from 20 to 38 parts by mass, and wherein the blending amount of the melamine compound is from 33 to 60 parts by mass, based on 100 parts by mass of the crosslinked polylactic acid resin.

14. The polylactic acid resin composition according to claim 8, wherein the blending amount of the triaryl phosphate is from 15 to 38 parts by mass, and wherein the blending amount of the melamine compound is from 20 to 60 parts by mass, based on 100 parts by mass of the crosslinked polylactic acid resin.

15. A method for producing a molded article, comprising supplying a polylactic acid resin composition as defined in claim 1 to a cylinder of an injection molding machine held at 180° to 220° C., and subjecting the polylactic acid resin composition to injection-molding within a mold held at 30° to 110° C.

16. A method for producing a polylactic acid resin composition as defined in claim 1 comprising melt-kneading raw materials comprising a polylactic acid resin, a triaryl phosphate, a melamine compound, and a carbodiimide compound, wherein the triaryl phosphate is in an amount of exceeding 10 parts by mass and 50 parts by mass or less, and a melamine compound in an amount of from 10 to 100 parts by mass, based on 100 parts by mass of the polylactic acid resin, and wherein the triaryl phosphate is one or more members selected from the group consisting of trixylenyl phosphate, tricresyl phosphate, dixylenylphenyl phosphate, dicresylphenyl phosphate, xylenyldiphenyl phosphate, and cresyldiphenyl phosphate, wherein the triaryl phosphate and the melamine compound are in a mass ratio, i.e. triaryl phosphate/melamine compound, of from 0.2 to 3, and wherein the melamine compound is melamine polyphosphate, melamine cyanurate, or melamine isocyanurate.

17. A method for inhibiting bleed-out of a triaryl phosphate from a molded article, comprising subjecting a polylactic acid resin composition as defined in claim 1 to injection-molding, wherein the triaryl phosphate is one or more members selected from the group consisting of trixylenyl phosphate, tricresyl phosphate, dixylenylphenyl phosphate, dicresylphenyl phosphate, xylenyldiphenyl phosphate, and cresyldiphenyl phosphate and wherein the melamine compound is melamine polyphosphate, melamine cyanurate, or melamine isocyanurate.

18. A polylactic acid resin composition obtained by blending a crosslinked polylactic acid resin with a triaryl phosphate in an amount of exceeding 10 parts by mass and 50 parts by mass or less, and a melamine compound in an amount of from 10 to 100 parts by mass, based on 100 parts by mass of the crosslinked polylactic acid resin, and melt-kneading the mixture, wherein the triaryl phosphate is one or more members selected from the group consisting of trixylenyl phosphate, tricresyl phosphate, dixylenylphenyl phosphate, dicresylphenyl phosphate, xylenyldiphenyl phosphate, and cresyldiphenyl phosphate, wherein the triaryl phosphate and the melamine compound are in a mass ratio, i.e. triaryl phosphate/melamine compound, of from 0.2 to 3, and wherein the melamine compound is melamine polyphosphate, melamine cyanurate, or melamine isocyanurate.

19. A method for producing a polylactic acid resin composition as defined in claim 18 comprising melt-kneading raw materials comprising a crosslinked polylactic acid resin, a triaryl phosphate, and a melamine compound, wherein the triaryl phosphate is in an amount of exceeding 10 parts by mass and 50 parts by mass or less, and a melamine compound in an amount of from 10 to 100 parts by mass, based on 100 parts by mass of the crosslinked polylactic acid resin, and wherein the triaryl phosphate is one or more members selected from the group consisting of trixylenyl phosphate, tricresyl phosphate, dixylenylphenyl phosphate, dicresylphenyl phosphate, xylenyldiphenyl phosphate, and cresyldiphenyl phosphate, wherein the triaryl phosphate and the melamine compound are in a mass ratio, i.e. triaryl phosphate/melamine compound, of from 0.2 to 3, and wherein the melamine compound is melamine polyphosphate, melamine cyanurate, or melamine isocyanurate.

* * * * *